United States Patent [19]

Yamada et al.

[11] Patent Number: 4,936,893
[45] Date of Patent: Jun. 26, 1990

[54] GLASS CONTAINER FORMING MOLD

[75] Inventors: Toshiyuki Yamada, Yokohama; Tateyuki Sasaki, Tokyo, both of Japan

[73] Assignee: Toyo Garasu Kabushiki Kaisha, Tokyo, Japan

[21] Appl. No.: 698,960

[22] Filed: Feb. 6, 1985

[30] Foreign Application Priority Data

Feb. 7, 1984 [JP] Japan .............................. 59-15850[U]

[51] Int. Cl.$^5$ ....................... B29C 33/00; C03B 9/347
[52] U.S. Cl. ................................... 65/374.11; 65/261; 65/305; 65/374.15; 65/231
[58] Field of Search ............. 65/374.1, 374.11, 374.15, 65/231, 261

[56] References Cited

U.S. PATENT DOCUMENTS

| | | | |
|---|---|---|---|
| 3,534,803 | 10/1970 | Bickerdike et al. | 65/374.15 |
| 3,887,350 | 6/1975 | Jemkins | 65/374.15 |
| 4,425,196 | 6/1985 | Felick et al. | 65/374.1 |

FOREIGN PATENT DOCUMENTS 0057952 8/1982 European Pat. Off. ........... 65/374.1

OTHER PUBLICATIONS

Handbook of Chemistry and Physics, 61st Edition, 1980–1981, CRC Press.
F. V. Tooley, "The Handbook of Glass Manufacture", vol. II, published 1974, pp. 1076–1077.
*The Making, Shaping and Treating of Steel*, Ninth Edition, pp. 1117–1121, 1149, 1153–1155, 1204, 1332, 1362, 1372, 1385.
Catalogue of NNICAFILM–Flexible Graphite, made by Nippon Carbon Co., Ltd., published 12/31/82, pp. 1–12.

*Primary Examiner*—Kenneth M. Schor
*Attorney, Agent, or Firm*—Armstrong, Nikaido, Marmelstein, Kubovcik & Murray

[57] ABSTRACT

A glass container forming mold, comprising an outer member formed of a metal, an inner member formed of a carbon material, and a flexible, compressible carbon sheet interposed between the outer member and the inner member, is provided.

10 Claims, 3 Drawing Sheets

FIG. I

GLASS CONTAINER FORMING MOLD

BACKGROUND OF THE INVENTION

The present invention relates to a glass container forming mold, more particularly to a glass container forming mold which is provided with an inner member formed of a carbon material.

A glass container such as a narrow neck glass bottle and a wide neck glass bottle, is usually made by forming a parison from a gob of molten glass at about 1100° to 1200° C. by blowing or pressing at a parison forming station of an IS machine provided with a blank mold and a neck ring, transferring the hot parison to a final blowing station provided with a blow mold and a bottom plate and then blowing the parison into the container. The blank mold, the neck ring, the blow mold and the bottom plate are conventionally made of a metal, usually of cast iron. In this specification the term of the mold is referred to including the neck ring and the bottom plate and the like.

It is necessary to coat the inner surfaces of the blank mold, the blow mold, the neck ring and the bottom plate with a lubricating and releasing agent so as to prevent defects such as wrinkles from generating on the surface of the product by decreasing friction resistance between the inner surface and the molten glass during forming, and facilitate removing the parison and the finished product from the molds and the like.

As the lubricating and releasing agent for this purpose, for example, a dope comprising graphite powder dispersed in an oily liquid, is often used. However, the graphite powder is lost rapidly by oxidation or attaching to the parison or the final product owing to high temperatures subjected to during forming, and one coating of the dope can withstand only about 50 to 100 forming operations or, for example, about 20 minute operation. This results in decrease of production rate, needs labor of operators for coating and further tends to cause dirty products.

Further, microcracks often generate on the surface of the parison even when the lubricating and releasing agent is used in the step of parison forming, and cause poor final products since they remain on the container formed by blowing at the final blowing station.

As a countermeasure it is thought to employ a combination forming mold consisting of, for example, an outer member of metal, e.g. cast iron and an inner member of a carbon material, since a forming mold consisting of only carbon material may be entirely unpractical because it tends to rupture. However, in this case it is practically difficult to machine both the members to allow the inner surface of the outer member and the outer surface of the inner member to be brought into tightly close contact with each other, and usually a gap of more than 10 $\mu$m is formed between the both.

Heat insulating air film is formed in the gap and hinders heat from dissipating from the inner member. Further, the amount of the gap is not uniform, for example, is different circumferentially. As a result the temperature distribution on the inner surface of the inner carbon member becomes uneven, and local burning on the inner surface of the inner carbon member tends to occur. The local burning causes surface defects on the parison and the final product.

SUMMARY OF THE INVENTION

The object of the invention is to provide a glass container forming mold, wherein a glass container having substantially no surface defect can be formed without using a lubricating and releasing agent.

According to the present invention there is provided a glass container forming mold such as a blank mold and a final blow mold, comprising an outer member formed of a metal, an inner member formed of a carbon material and a flexible, compressible carbon sheet interposed, preferably tightly between the outer member and the inner member.

Other objects and advantages of the invention will be apparent from the following description and the accompanying drawings.

DETAILED DESCRIPTION OF THE PREFERRED EMBODIMENT

Figure 1:
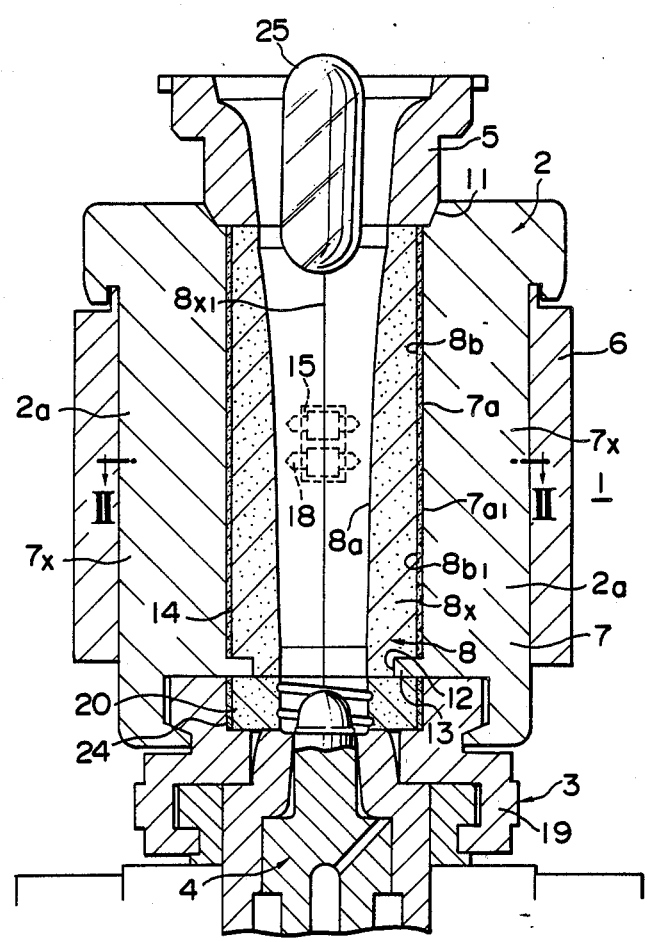
FIG. 1 is a central vertical section of a parison forming station provided with a blank mold and a neck ring according to the invention, showing a state where a glass gob is been charged thereto.

Referring to FIG. 1, a parison forming station 1 of a blow and blow type is provided with a blank mold 2 for forming the sidewall portion of a parison, a neck ring 3 for forming the neck or mouth portion of the parison, a plunger 4, a funnel 5, and a holder 6 for hingedly closing and opening the halves 2a of the blank mold 2.

Figure 3:
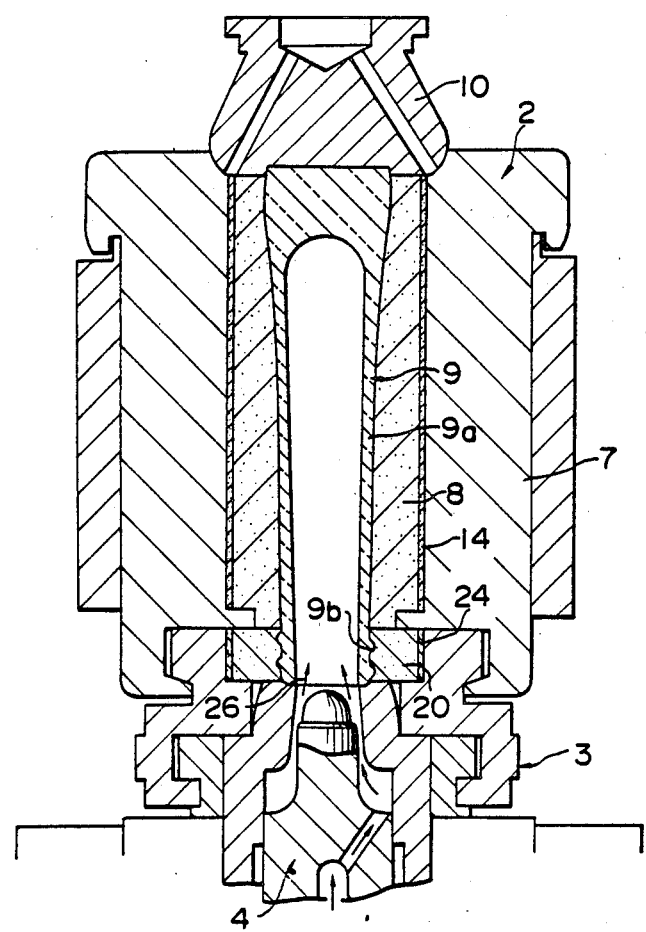
FIG. 3 is a central vertical section showing a state immediately after a parison has been formed at the parison forming station indicated in FIG. 1.

Each of the halves 2a of the blank mold 2 is provided with an outer mold member 7 formed of cast iron, and an inner mold member 8 formed of a carbon material and having an inner surface 8a of a configuration corresponding to the outer surface of the sidewall portion 9a of a parison 9 to be formed (refer to FIG. 3).

In the specification the carbon material is referred to including carbon and graphite, and preferably of the type having high heat-resistance, high wear-resistance, high lubricity and relatively high strength, e.g. Shore D hardness of 90 to 120 and compression stress of 1000 to 4000 kg/cm$^2$.

The inner surface 7a of the outer mold member 7 at a closed state has a concave portion 11 for engaging with the funnel 5 and a baffle 10 (refer to FIG. 3) at the upper end thereof, a cylindrical portion 7a$_1$, and an annular protrusion portion 13 to be engaged with an annular dent portion 12 of the inner mold member 8 at the lower end thereof. Accordingly, the inner surface of the half 7x of the outer mold member 7 is semicylindrical except at the upper end and the lower end thereof.

The outer surface 8b of the inner mold member 8 at a closed state has a cylindrical portion 8b$_1$ having a diameter slightly smaller (usually smaller by about 0.2 to 0.5 mm) than that of the cylindrical portion 7a$_1$ of the outer mold member 7, except at the annular dent portion 12. Accordingly, the outer surface of the half 8x of the inner mold member 8 is semicylindrical except at the lower end thereof. The thickness of the portion corresponding to the cylindrical portion $8b_1$ of the inner mold member 8 is usually about 5 to 20 mm.

A carbon sheet 14 is interposed, preferably tightly, between the cylindrical portion $7a_1$ of the inner surface 7a of the outer mold member 7 and the cylindrical portion $8b_1$ of the outer surface 8b of the inner mold member 8. In the specification the carbon sheet is referred to a flexible and compressible carbon or graphite foil or sheet, such as Nicafilm (registered trademark, made by Nippon Carbon Inc.), of about 0.2 to 1.0 mm thick and having thermal conductivity and heat resistance, of which compressibility may be, e.g., 25 to 50%.

Figure 2:
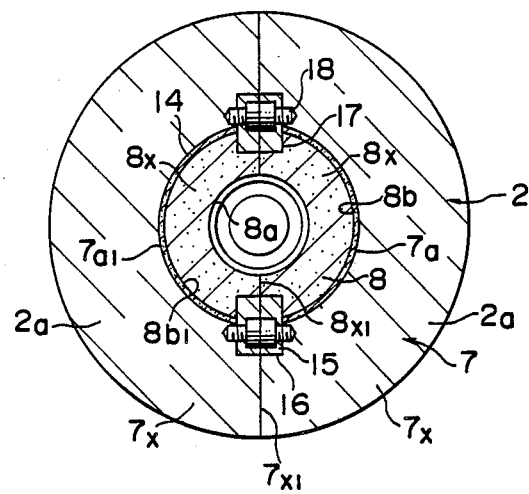
FIG. 2 is a horizontal section taken along line II—II of FIG. 1.

So as to interpose tightly the carbon sheet 14, depressed portions 16 for inserting a clamping piece 15 are formed at about the middle portions in the axial direction of the inner edges of both the side faces $7x_1$ of the half 7x, as best illustrated in FIG. 2. The depressed portions may be formed at only the vicinities of the upper end portion and the lower end portion of the above inner edge, or at the vicinities of the upper and lower end portions and the middle portion as aforementioned, though not shown. Depressed portions 17 for inserting the clamping piece 15 are formed at the portions corresponding to the depressed portion 16, of the outer edges of both the side faces $8x_1$ of the half 8x also. The clamping piece 15 is adapted to be fixed to the half 7x with a screw 18, and is dimensioned such that the outer surface thereof may be flush with the side faces $7x_1$ and $8x_1$ or slightly depressed with respect to the latters at the fixed state.

The carbon sheet 14 may be tightly interposed, for example, as follows; First are prepared two pieces of rectangular, planar carbon sheets having a first side of the length substantially equal to the height of the cylindrical portion $8b_1$, a second side of the length substantially equal to half of the circumference of the cylindrical portion $8b_1$, and a thickness which is slightly larger than half of the difference between the diameter ($d_1$) of the cylindrical portion $7a_1$ at normal room temperature and the diameter ($d_2$) of the cylindrical portion $8b_1$ at the normal room temperature, to the extent that the thickness of the carbon sheet 14 decreases to $\frac{1}{2}(d_1-d_2)$ with radial compression force exerted by tightly interposing as aforementioned, and formed with dent portions for inserting the clamping pieces 15 therethrough in the first side and the side opposing thereto.

The carbon sheet 14 is interposed between the semicylindrical portion of the half 8x corresponding to the cylindrical portion $8b_1$ and the semicylindrical portion of the half 7x corresponding to the cylindrical portion $7a_1$, such that the whole of the former semicylindrical portion is covered with the carbon sheet at a tightly interposed state, and clamped such that a pressure of, e.g., 100 to 200 kg/cm² be exerted thereto. At this clamping state the clamping piece 15 is inserted into the depressed portions 16 and 17, and then fixed to the half 7x of metal with the screw 18.

The carbon sheet 14 is bent to the curvature of the cylindrical portion $8b_1$, but usually will not rupture since the curvature is relatively small and the carbon sheet is flexible. Since the clamping piece 15 is not fixed with the screw 18 to the inner mold member 8 made of relatively brittle carbon material, but is fixed to the outer mold member 7 of metal, the carbon sheet 14 is tightly interposed securely.

The compressible carbon sheet 14 having a relatively high thermal conductivity is tightly interposed between the outer mold member 7 and the inner mold member 8, and no air layer is present between the outer mold member 7 and the inner mold member 8, and thus the thermal conductivity between both the members is uniform and improved.

The neck ring 3 consisting of halves is also provided with an outer member 19 formed of a metal, usually cast iron, an inner member 20 formed of a carbon material and adapted to be in contact with the neck portion 9b of the parison 9, and carbon sheets 24 interposed, preferably tightly therebetween.

A molten glass gob 25 is charged into the parison forming station 1 having the blank mold 2 and the neck ring 3 which are constructed as aforementioned, as shown in FIG. 1, and then formed into the parison 9 by blowing in air under pressure 26 as shown in FIG. 3. The coating of a lubricating and releasing agent is not necessary for the above forming, since the inner mold member 8 and the inner member 20 to be in contact with the molten glass is formed of a carbon material having high lubricity and releasing performance. Further, since the carbon sheet is interposed, preferably tightly between the outer (mold) member and the inner (mold) member, heat can be dissipated satisfactorily from the inner (mold) member, and thus burning at the inner (mold) member and surface detects such as microcracks in the parison will scarcely be caused.

Figure 4:
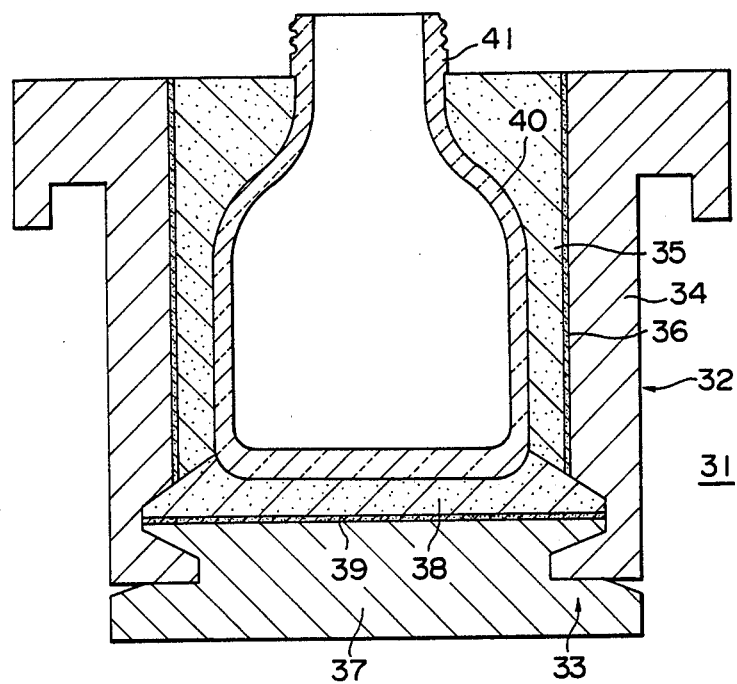
FIG. 4 is a fragmental, central section of a final blowing station having a final blow mold and a bottom plate according to the invention, showing a state immediately after a glass container has been formed.

A final blowing station 31 shown in FIG. 4 is provided with a blow mold 32 and a bottom plate 33. The blow mold 32 consists of halves, and has an outer mold member 34 made of a metal, usually cast iron, an inner mold member 35 made of carbon material, and a carbon sheet 36 interposed, preferably tightly in a similar manner as the carbon sheet 14 between the outer mold member 34 and the inner mold member 35. The base member 33 is also provided with an outer member 37 made of a metal, usually cast iron, an inner member 38 made of carbon material, and a carbon sheet 39 interposed between the outer member 37 and the inner member 38. The inner surfaces of the inner mold member 35 and the inner member 38 form cooperatively a configuration corresponding to the outer surface of the portion beneath the neck portion 41 of the finished product, that is, glass container 40. In this case also a glass container having substantially no surface defects can be made without coating the lubricating and releasing agent.

The glass container in the invention in its broadest context includes a glass hollow article such as a tumbler.

What is claimed is:

1. A glass container forming mold comprising an outer member formed of a metal, an inner member formed of a substantially carbon material, and a flexible, compressible carbon sheet interposed between said outer member and said inner member.

2. A glass container forming mold as claimed in claim 1, wherein said mold is a blank mold.

3. A glass container forming mold as claimed in claim 1, wherein said mold includes a neck ring comprising a further outer member formed of a metal, a further inner member formed of carbon material, and a further flexible, compressible carbon sheet interposed between the further outer member and the further inner member.

4. A glass container forming mold as claimed in claim 1, wherein said mold is a blow mold.

5. A glass container forming mold as claimed in claim 1, wherein said mold includes a bottom plate comprising a further outer member formed of a metal, a further inner member formed of carbon material, and a further flexible, compressible carbon sheet interposed between the further outer member and the further inner member.

6. A glass container forming mold as claimed in claim 1, wherein said carbon sheet is compressed between said outer member and said inner member such that substantially no air gap between the outer member and the inner member is present.

7. A glass container forming mold as claimed in claim 1, wherein said outer member is formed of cast iron.

8. A glass container forming mold as claimed in claim 1, wherein said carbon material of said inner member has compression stress of 1000 to 4000 kg/cm$^2$.

9. A glass container forming mold as claimed in claim 1, wherein said carbon sheet is 0.2 to 1.0 mm thick and has compressibility of 25 to 50%.

10. A glass container forming mold as claimed in claim 6, wherein said carbon sheet is compressed at a pressure of 100 to 200 kg/cm$^2$.

* * * * *